United States Patent [19]

Wollar

[11] Patent Number: 4,709,841
[45] Date of Patent: Dec. 1, 1987

[54] TOOL FOR INSTALLING EXPANDABLE FASTENER

[75] Inventor: Burnell Wollar, Barrington, Ill.

[73] Assignee: Phillips Plastics Corporation, Phillips, Wis.

[21] Appl. No.: 872,272

[22] Filed: Jun. 9, 1986

[51] Int. Cl.⁴ .......................... B21J 15/00; B21J 15/38
[52] U.S. Cl. ........................................ 227/55; 227/10; 227/147; 227/156; 29/509; 29/522 A
[58] Field of Search ..................... 227/8, 9, 10, 11, 55, 227/147, 149, 156; 29/509, 522 A; 411/500, 509, 510, 910, 32, 439

[56] References Cited

U.S. PATENT DOCUMENTS

| | | | |
|---|---|---|---|
| 3,724,738 | 4/1973 | Hurst | 227/147 |
| 3,788,537 | 1/1974 | Fox | 227/147 |
| 4,057,886 | 11/1977 | Brass | 411/500 X |
| 4,201,325 | 5/1980 | Jochum | 227/149 X |
| 4,519,536 | 5/1985 | Steigauf | 227/149 X |

FOREIGN PATENT DOCUMENTS 2076272 10/1971 Fed. Rep. of Germany ...... 227/147
3410007  9/1985 Fed. Rep. of Germany ...... 227/147

Primary Examiner—Paul A. Bell
Attorney, Agent, or Firm—James E. Nilles; Thomas F. Kirby

[57] ABSTRACT

A hand-held manually-operable tool is disclosed for installing a two-piece expandable plastic fastener (including an expandable body and an insertable pin) in a panel hole. The tool comprises a hand-held housing having a hollow barrel from which a spring-biased hollow plastic sleeve projects. A pushrod within the hollow sleeve is movable with the housing. The sleeve tip releasably engages and supports either the body or pin of a fastener manually mounted thereon and aligns the pin with the pushrod which subsequently forces the pin into the body to effect expansion. The sleeve tip end has either resiliently flexible legs to engage the body or resiliently flexible compressible foam rubber strips to engage the pin. In use, the tool directs the body into the panel hole and is pressed to cause the sleeve to retract so that the pushrod can force the pin into the body to effect body expansion. Thereafter, the tool is moved away from the panel to allow the sleeve to re-extend from the tool barrel and disengage from the fastener. Sleeves of different sizes are provided. A hollow adapter member for the sleeve and an extension member for the pushrod enable a sleeve to handle different sized fasteners. A trigger-operated latch member engages the sleeve to prevent premature sleeve retraction.

13 Claims, 22 Drawing Figures

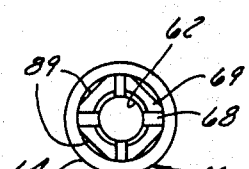
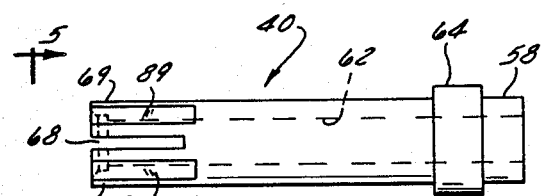
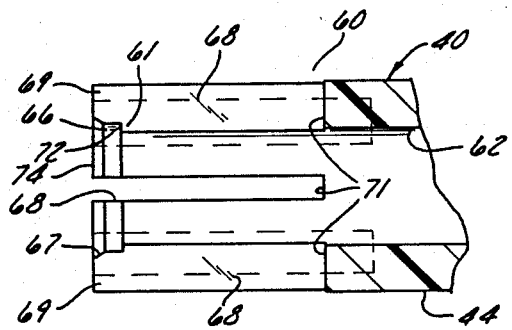
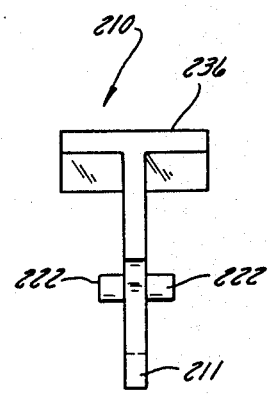
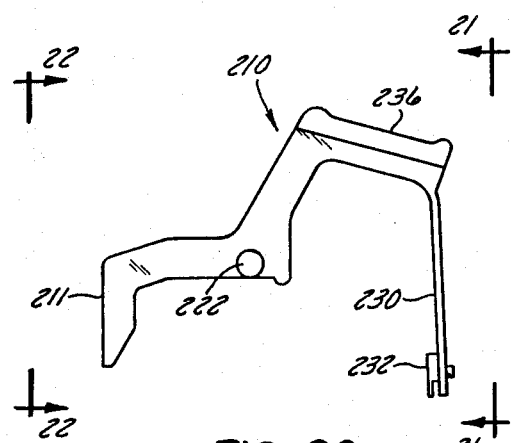
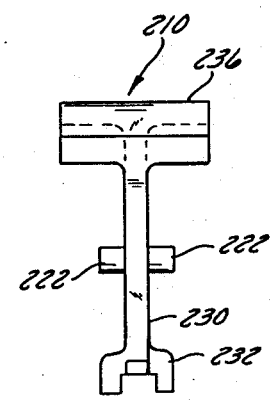

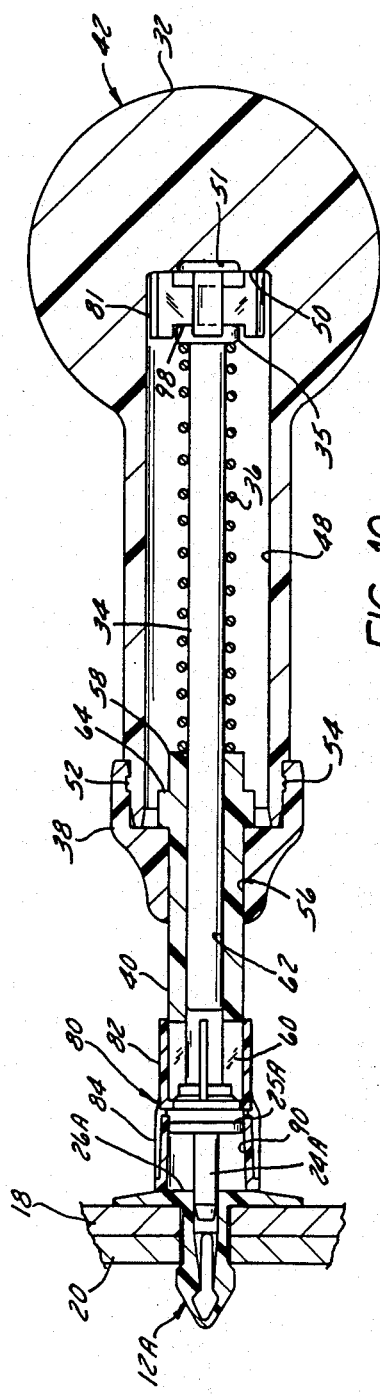

TOOL FOR INSTALLING EXPANDABLE FASTENER

BACKGROUND OF THE INVENTION

1. Field of Use

This invention relates generally to tools for installing two-piece expandable plastic fasteners in panel holes.

In particular, it relates to improved fastener-engaging sleeves for such tools and to adapter means for such sleeves

2. Description of the Prior Art

Various industries use fasteners to secure two panels together in face-to-face relationship. One type of commonly used fastener is a two-piece expandable fastener which comprises a hollow expandable plastic fastener body insertable into a panel hole and an associated fastener pin which is pushed into the body to effect expansion. In use, for example, the fastener body is manually inserted into aligned panel holes in two adjacent confronting panels and the fastener pin (which is preinstalled in a bore in the fastener body) is then forcibly inserted axially into the fastener body, as by a hammer or impact tool, to effect expansion of the latteer, thereby causing the panels to be entrapped between the head of the fastener body and its expanded shank. In relatively small fasteners (on the order of about one inch or less in total length), only a relatively small force is required to insert the fastener pin and firm manual pressure on an appropriately shaped tool, such as a hand-held punch, is sufficient.

However, in mass-production operations wherein numerous fasteners are being installed, the separate steps of manual insertion of the fastener body in the panel holes followed by alignment of the hand-held punch with the fastener pin and subsequent application of pressure, is time-consuming, costly, tedious and inefficient, particularly since the hand-held punch can slip off the pin as force is applied.

Various types of manually or automatically operable tools are known and in use for installing fasteners or pins into panel holes or for driving nails into objects. U.S. Pat. No. 3,788,537 shows a hand-held tool for installing spring pins in panel holes.

SUMMARY OF THE INVENTION

In accordance with the present invention, there are provided two preferred embodiments of improved hand-held manually operable tools for installing two-piece expandable plastic fasteners in panel holes. The tools are adapted for use with a fastener which comprises a hollow fastener body which expands when a fastener pin pre-installed in the bore is pressed thereinto. More specifically, the fastener body comprises a head at one (head) end, an expandable shank at the other (insertion) end, and a bore therethrough. The fastener pin, which comprises a pin shank having a pin head at one end of the pin shank, is pre-installed in the bore and projects from the head end of the fastener body.

A tool in accordance with the invention generally comprises a housing having a hand-grip portion and a projecting barrel portion. The barrel portion has an outer end and a barrel bore which is open at its outer end and closed at its inner end by a bore end wall. An end cap having a cap hole therethrough is removably mounted on the outer end of the barrel portion. A rigid elongated pushrod is stationarily, but removably, mounted in the barrel bore and the outer end of the pushrod extends through the cap hole for engaging the fastener pin. An elongated generally cylindrical sleeve made of plastic and having an axial sleeve bore is slidably mounted on the stationary pushrod and is axially movable thereon through the cap hole between extended and retracted positions. A helical compression spring disposed on the pushrod between the bore end wall and the inner end of the sleeve biases the sleeve toward extended position.

The outer end or tip end of the sleeve is provided with means for frictionally engaging some portion of the fastener to thereby releasably support the entire fastener prior to installation and to maintain the fastener pin axially aligned with the pushrod so that the latter can eventually engage it. In the first embodiment of the tool disclosed herein, wherein the sleeve is made of slightly resilient flexible plastic, such means comprise an annular recess in the sleeve tip end and concentric with the sleeve bore and a shoulder means adjacent the inner end of the recess. The recess is of slightly smaller diameter than the diameter of the fastener body head. However, the sleeve tip end is provided with a plurality of circumferentially spaced apart slots which extend axially inwardly from the outer edge of the sleeve tip end and define sleeve legs which can flex resiliently outwardly sufficiently to receive and frictionally engage the fastener body head. The annular recess is chamferred along its outer edge to facilitate insertion of the fastener body head. In the second embodiment of the tool disclosed herein, the sleeve bore is lined with resiliently flexible, compressible foam rubber strips which define a recess of slightly smaller diameter of the fastener pin head. The strips are compressible upon insertion of the pin head to receive and frictionally engage the pin head.

In use, the tool, with a fastener attached to the sleeve tip end, is manipulated to direct the insertion end of the fastener body into the panel hole so that the underside of the fastener body head bears against the panel. The tool is then manually pressed toward the panel thereby causing the sleeve, though motionless, to assume a relative retracted position within the barrel bore and enabling the pushrod to engage the fastener pin and force it into the bore in the fastener body to cause expansion of the latter. Then, the tool is manually moved away from the panel, thereby allowing the sleeve to be biased back to its extended position and causing the means on the sleeve tip end to disengage from the fastener.

Sleeves of various sizes may be substituted for one another to accommodate fasteners of various sizes. However, in further accordance with the invention, adapter means are provided for use with a sleeve of a particular size to enable the tool to support and install a fastener of a different size. Such adapter means comprise two members, namely: an adapter member which fits on the sleeve tip end but has a different diameter annular recess, and an extension member which is disposed within the tool housing behind the pushrod to extend the effective length of the pushrod necessitated by the added length of the adapter member.

In further accordance with the invention, selectively operable releasable latching means are provided, as shown in the second embodiment, to temporarily prevent axial movement of the sleeve in the event added force is needed to initially force the insertion end of the fastener body into the panel hole. The latching means comprise a spring-biased latch member pivotally mounted on the tool housing (i.e., on the end cap of the barrel portion) and a detent groove formed on the sleeve and releasably engageable by the latch member.

The invention offers several advantages over the prior art. For example, the fastener is only handled once by the tool operator, i.e., when it is initially secured to the sleeve tip end (or adapter member, if used), and this automatically ensures its proper alignment with the pushrod which sets its fastener pin. Thus, installation time and effort are reduced. The adapter means enables the basic tool to be used with various types and sizes of fasteners and increase the utility of the basic tool. The adapter member and extension member are themselves economical to manufacture in various sizes and are easy to install on and remove from the tool. The latching means enables extra force to be applied, if needed, when inserting the fastener body into the panel hole. Other objects and advantages of the invention will hereafter appear.

DRAWINGS

FIG. 3 is an enlarged side elevation view of the sleeve shown in FIGS. 1 and 2;

FIG. 4 is an end elevation view taken on line 4—4 of FIG. 3;

FIG. 5 is an end elevation view taken on line 5—5 of FIG. 3;

FIG. 6 is an enlarged cross-section view of the tip end of the sleeve of FIG. 3 before a two-piece fastener is mounted thereon;

FIG. 10 is a cross-section view of the tool of FIGS. 1 through 9 with an adapter member mounted on the sleeve and an extension member mounted in the tool housing and shows a fastener attached to the adapter member;

FIG. 11 is an enlarged view of the adapter member of FIG. 10 and shows the fastener fully installed;

FIG. 20 is a side elevation view of the latch member shown in FIGS. 18 and 19;

FIG. 21 is an end elevation view taken on line 21—21 of FIG. 20; and

FIG. 22 is an end elevation view taken on line 22—22 of FIG. 20.

DESCRIPTION OF PREFERRED EMBODIMENTS

Referring to FIGS. 1 through 9, numeral 10 designates a first embodiment of a hand-held manually operable tool which is employed to install a two-piece expandable fastener, such as fastener 12, in aligned panel holes 14 and 16 in adjacent panels 18 and 20, respectively, to secure those panels together.

Figure 2:
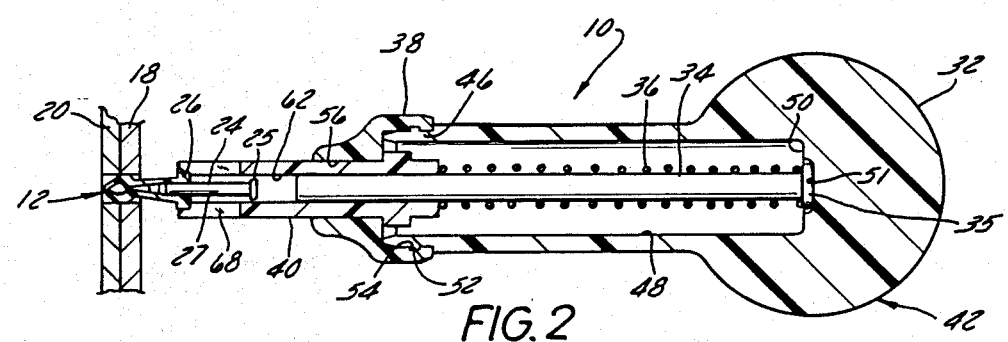
FIG. 2 is a cross-section view of the tool of FIG. 1 and showing a fastener mounted thereon and partially inserted into a panel hole.
Figure 7:
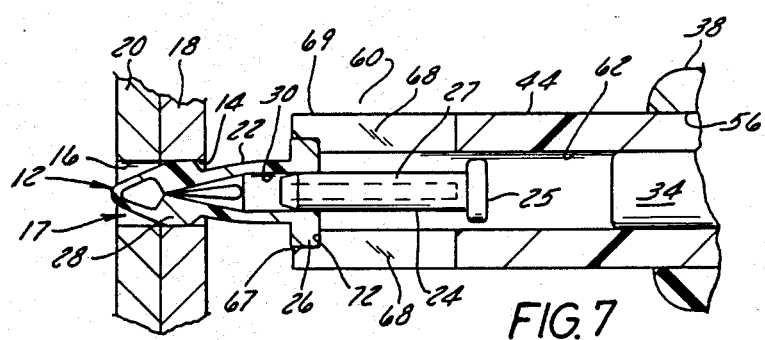
FIG. 7 is an enlarged cross-section view of a portion of the sleeve and fastener shown in FIG. 2.
Figure 8:
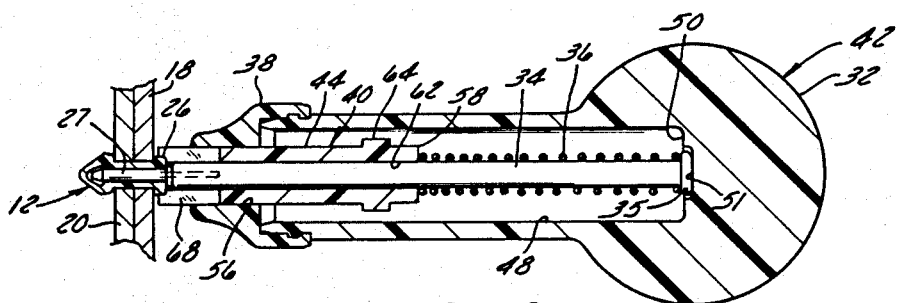
FIG. 8 is a view similar to FIG. 2 but showing the fastener fully installed and expanded in the panel hole.
Figures 1, 9:
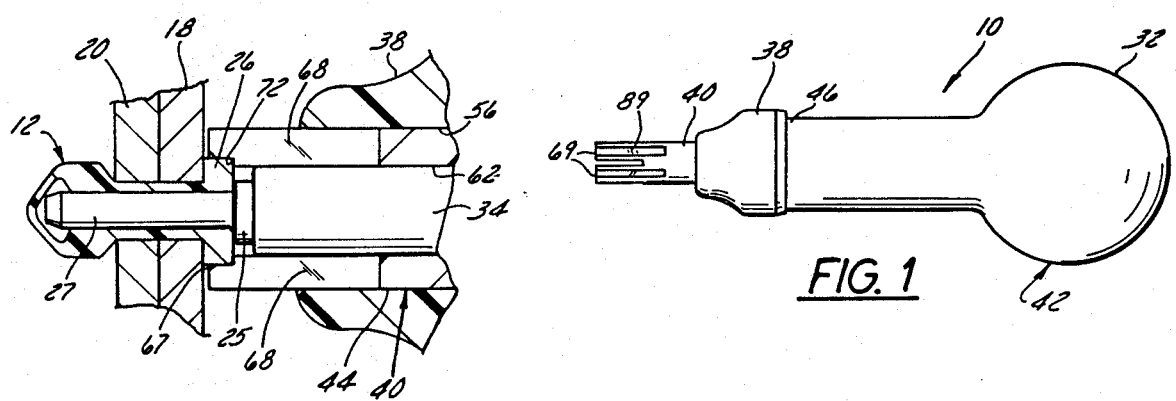
FIG. 1 is a side elevation view of a first embodiment of a tool in accordance with the invention.
FIG. 9 is an enlarged cross-section view of a portion of the sleeve and fastener shown in FIG. 8.
Figure 14:
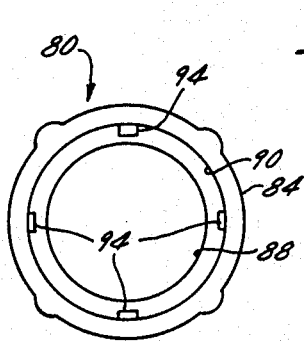
FIG. 14 is an end elevation view taken on line 14—14 of FIG. 12.
Figure 12:
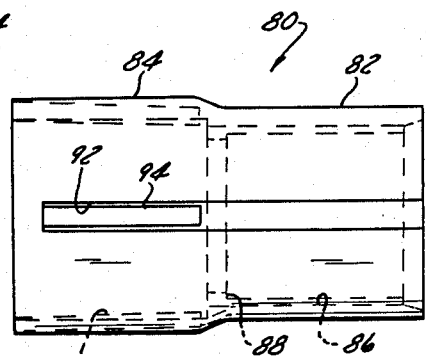
FIG. 12 is an enlarged side elevation view of the adapter member of FIGS. 10 and 11.
Figure 13:
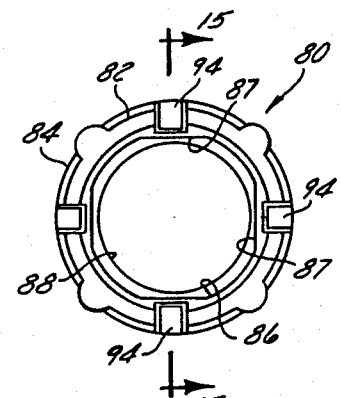
FIG. 13 is an end elevation view taken on line 13—13 of FIG. 12.
Figure 15:
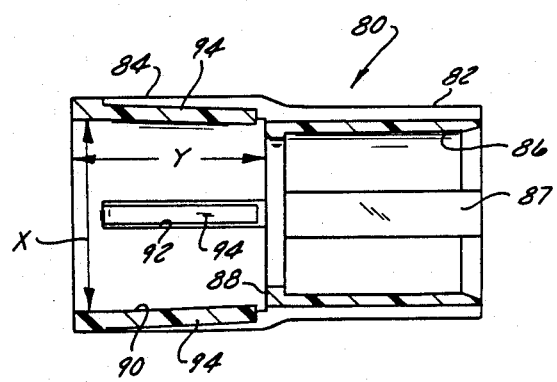
FIG. 15 is a cross-section view taken on line 15—15 of FIG. 13.

Referring to FIG. 7, fastener 12, which is commercially available, comprises a fastener body 22 (plastic) and a fastener pin 24 (plastic or other material). Body 22 comprises a panelengaging head 26 and an expandable slotted body shank 28 and has a fastener body bore 30 therein for receiving fastener pin 24. Fastener pin 24 has a pin shank 27 and a pin head 25. FIGS. 2 and 7 show fastener pin 24 pre-installed but not fully-inserted in body bore 30 of fastener body 22. FIGS. 2 and 7 also show body shank 28 partially inserted in the aligned panel holes 14 and 16 (hereinafter together referred to as "panel hole 17"). FIGS. 8 and 9 show pin 24 fully-inserted in body bore 30, as by means of tool 10, to thereby cause expansion of shank 28 and entrapment of the panels 18 and 20 between head 26 and expanded shank 28 of fastener body 22.

Referring to FIGS. 1, 2 and 8, tool 10 comprises five basic components, namely: a molded plastic hollow housing 32, a rigid metal elongated pushrod 34, a helical compression or biasing spring 36, a plastic end cap 38, and a hollow plastic sleeve 40.

Housing 32 comprises a hand-grip portion 42 and a projecting hollow cylindrical barrel 44 having an outer barrel end 46. Barrel 44 has a housing or barrel bore 48 which opens at and extends inwardly from barrel end 46 and barrel bore 48 is closed at its inner end by an end wall 50 which is integral with housing 32.

End cap 38 is removably mounted on barrel end 46 by means of an annular projection 52 on the barrel end which engages an annular groove 54 on the inside of the end cap in a snap-together fit. End cap 38 has an end cap hole 56 therethrough for accommodating sleeve 40 and, of course, the pushrod 34 therein.

Pushrod 34 is sized and disposed in barrel bore 48 so that its inner end engages end wall 50 and so that its outer end extends through and terminates near the outer end of end cap hole 56. Pushrod 34 has a head or flange 35 at its inner end and housing end wall 50 includes a depression 51 to receive and center it.

As FIGS. 3 through 6 show, sleeve 40, which is fabricated of slightly resilient flexible plastic, has an inner end 58 and an outer end or sleeve tip 60 and also has a sleeve bore 62 which extends entirely therethrough and is open at both ends. Sleeve 40 also has an outwardly extending annular flange or projection 64 near its inner end 58. Sleeve 40 is slidably mounted on pushrod 34 and is axially movable thereon between a fully-extended position (FIGS. 1 and 2) wherein it extends outwardly of end cap hole 56 for most of its length and a fully-retracted position (FIGS. 8 and 9 wherein it is retracted within barrel bore 48 and its tip 60 is near to the outer side of end cap 38. Sleeve 40 is prevented from being withdrawn from or falling out of end cap hole 56 by flange 64 which is of larger diameter than end cap hole 56 and which is engageable with the inside of end cap 38 when sleeve 40 is in fully extended position.

Spring 36 is disposed on pushrod 34 between pushrod head 35 and inner end 58 of sleeve 40 and operates to bias the sleeve toward fully-extended position (FIGS. 1 and 2), although it permits the sleeve to be forced to fully retracted position (FIG. 8).

Tip 60 of sleeve 40 is provided with means which enable it to releasably support fastener 12 before and while shank 28 of fastener body 22 is being inserted in panel hole 17 by manipulation of tool 10 (FIGS. 2 and 7). These means also operate to axially align fastener pin 24 with pushrod 34 so that pushrod 34 can force pin 24 fully into body bore 30 of fastener body 22 as tool 10 is manually pressed toward panel 18 (FIGS. 8 and 9). As FIGS. 3–6 show, such means frictionally engage a portion of the fastener and comprises, in sleeve 40 of tool 10, an annular recess 66 at the outer end of sleeve bore 62 and communicating therewith for receiving head 26 of fastener body 22, a shoulder or abutment 61 within sleeve bore 62 and adjacent recess 66 for bearing against fastener body head 26, and a plurality of slots 68 which extend inwardly from the outer or tip end 60 of sleeve 40 and define resiliently flexible legs 69. The outer edge of recess 66 is chamferred as at 67 to facilitate fastener head insertion into the recess and effect outward flexing of the legs 69. The legs 69 are circumferentially spaced apart from one another so that each is free to flex. Each slot 68 has an outer open end and a closed inner end 71, and extends entirely between and through the inner and outer sides of the wall of sleeve 40. Thus, each leg 69 is resiliently flexible for a short distance toward and away from the axis of sleeve 40.

Referring to FIGS. 6 and 7, assuming that a given fastener body 22 has a fastener body head 26 with a predetermined diameter and a predetermined thickness, then sleeve tip 60 is designed so that its annular recess 66 has a depth (i.e., the distance between an outer end edge 74 of a leg 69 and an outer edge or face 72 of shoulder 61) which is slightly less than the predetermined thickness of the fastener body head 26. Furthermore, sleeve tip 60 is designed so that, when recess 66 is not occupied by a fastener body head 26, the diameter of recess 66 is slightly less than the predetermined diameter of body head 26. However, because sleeve 40 is made of resilient flexible plastic, the legs 69 can flex outward slightly to accommodate, frictionally engage and hold body head 26 when fastener 12 is manually mounted on sleeve 40. As will be understood, if sleeve 40 were provided with only one slot such as a slot 68, the sleeve portions adjacent that slot would be flexible and would define a recess in which the body head 26 could be received and frictionally engaged.

Tool 10 is employed as follows. Assume that sleeve 40 is biased to fully-extended position. Fastener 12, with its pin 24 in pre-installed position and its body 22 unexpanded, is manually mounted on tip 60 of sleeve 40, as previously explained. Then, tool 10 is manipulated so as to insert body shank 28 into panel hole 17 (FIGS. 2 and 7). Tool 10 is then manually moved toward panel 18 and, as this occurs, sleeve 40 is forced axially toward its retracted position but its tip 60 is still engaged with fastener body head 26. At the same time, pushrod 34 (which is moved along with tool housing 32) advances relative to sleeve 40 and engages the outer end or head 27 of fastener pin 24. As tool 10 continues to be pressed toward panel 18, sleeve 40 assumes its fully retracted position, and pushrod 34 forces fastener pin 24 fully into fastener body bore 30 causing expansion and full installation of fastener shank 28 (FIGS. 8 and 9). At this stage, tool 10 is moved away from panel 18, sleeve 40 moves toward its extended position under spring bias and tip 60 disengages from body head 26. Tool 10 is now in the condition shown in FIG. 1 and ready to receive and install another fastener 12 in another panel hole 17.

As is apparent from the foregoing, sleeve 40 is adapted to be used with a fastener 12 of a specific size and shape. Therefore, in further accordance with the invention, to enhance the utility of tool 10, adapter means are provided to enable tool 10 to employ fasteners of other shapes and sizes. Such adapter means are shown in FIGS. 10 through 17 and comprise two components or members, namely, an adapter member 80 (FIGS. 10–15) which is removably mountable on tip 60 of sleeve 40 to receive a fastener of a specific size and a pushrod extension member 81 (FIGS. 10, 16 and 17) which is removably mountable with tool housing 32 to extend the effective length of pushrod 34.

Referring to FIGS. 10 through 15, adapter member 80 is a one-piece generally tubular component formed of slightly flexible resilient plastic, as by injection molding. Adapter member 80 comprises a first portion 82 which adapts it for installation on tip 60 of sleeve 40 of tool 10 and an integral second portion 84 which is adapted to receive a larger fastener 12A (FIGS. 10 and 11) which is similar to fastener 12 but which is understood to have a body head 26A and a pin head 25A of larger diameter and thickness than those of fastener 12. However, an adapter member (not shown) for a fastener of smaller size than shown is within the scope of the invention.

First portion 82 has a bore 86, open at both ends, which is of a diameter sufficient to accommodate and frictionally engage tip 60 of sleeve 40 on which adapter member 80 is to be mounted. Bore 86 includes flats or lands 87 which engage flats or lands 89 on tip 60 to prevent rotation of adapter member 80 on sleeve 40. Bore 86 has an internal annular flange or shoulder 88 against which tip 60 can bear (see FIG. 11).

Second portion 84 has a bore 90 which is open at both ends and concentric with and in communication with bore 86 in first portion 82. Second portion 84 is provided with means for frictionally engaging some portion of fastener 12A to thereby releasably support the entire fastener and to align its pin 24A with rod 34. Such means take the following form. Bore 90 is separated from bore 86 by shoulder 88. Bore 90 has a maximum diameter X (FIG. 15) which is sufficient to slidably receive the pin head 25A of larger fastener 12A to be mounted thereon and has a depth Y (FIG. 15) to accommodate such body head. Second portion 84 has a plurality of circumferentially spaced apart slots 92 formed therein and each slot 92 is of generally U-shaped configuration so as to define a resilient flexible locking tab 94 which is integrally connected at one end to the wall of the second portion 84. The free end of each tab 94 is biased inwardly into bore 90 but is movable outwardly when fastener pin head 25A is inserted into bore 90 so as to frictionally engage that head and support the fastener 12A.

Figure 17:
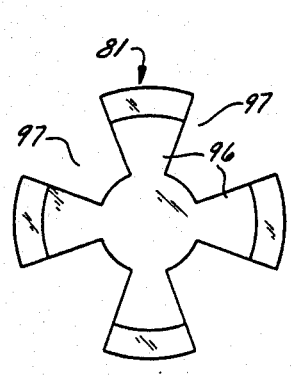
FIG. 17 is an end elevation view taken on line 17—17 of FIG. 16.
Figure 16:
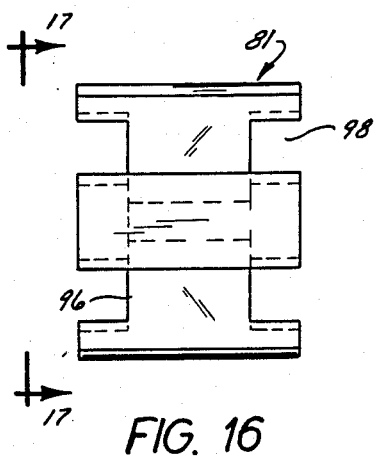
FIG. 16 is an enlarged side elevation view of the extension member of FIG. 10.

When adapter member 80 is mounted on sleeve 40, pushrod 34 is not of itself of sufficient length to reach and effect insertion of fastener pin 24A of the larger fastener 12A. Accordingly, the pushrod extension member 81 (of appropriate length) must be inserted between end wall 50 of barrel bore 48 and the inner end of pushrod 34. This is accomplished by disassembling tool 10, installing extension member 81 at that location and then re-assembling tool 10. As FIGS. 10, 16 and 17 show, pushrod extension member 81 takes the form of a plastic component having a shape and size which enables it to fit snuggly within barrel bore 48 in tool housing 32. Member 81 is constructed to conserve plastic material of which it is fabricated and to facilitate its insertion into and removal from barrel bore 48. Thus, as FIG. 17 shows, member 81 has a generally cruciform cross-section configuration defined by four radially extending arms 96, with relieved regions or spaces 97 therebetween and relieved regions 98 at opposite ends (FIG. 16). The spaces 97 also enable the user to grasp the end of member 81 when it is to be removed from barrel bore 48.

When the above described adapter means, comprising members 80 and 81, are employed with tool 10, the tool operates in substantially the same manner as heretofore described, as comparison of FIGS. 10 and 11 show.

It is to be noted with regard to sleeve 40, that, although four tip slots 68 and four legs 69 are shown in the drawings, a greater or lesser number could be employed, provided adequate gripping power is available. Similarly, adapter member 80, shown with four locking tabs 94, could employ a greater or lesser number.

Figure 18:
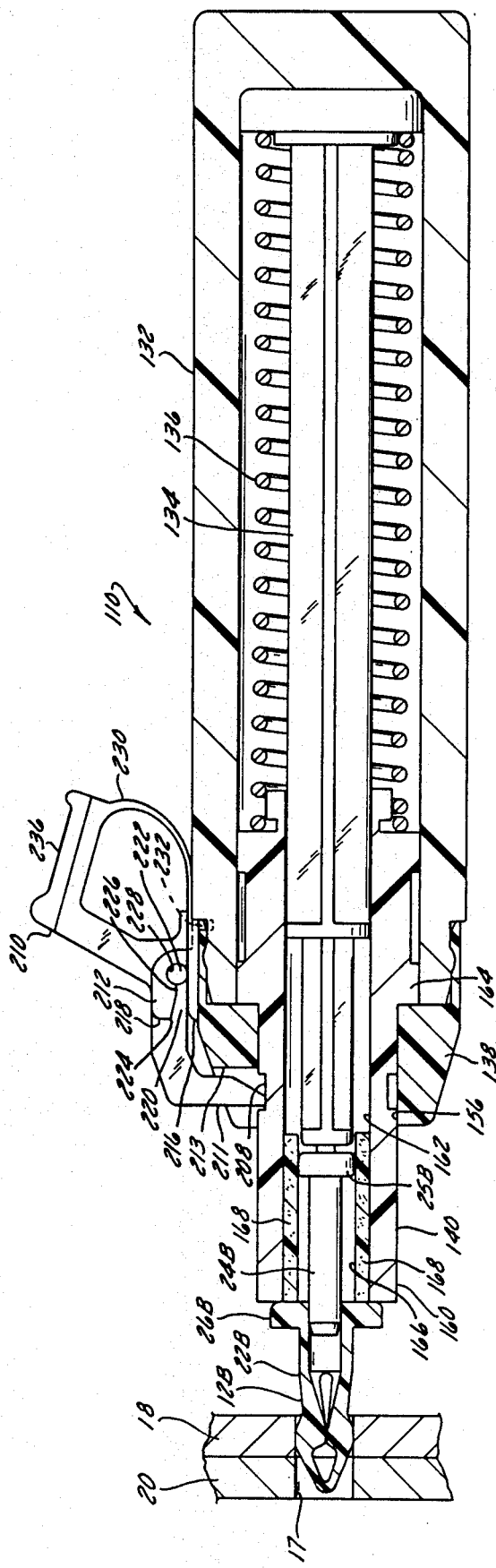
FIG. 18 is a cross-section view of a second embodiment of a tool in accordance with the invention which has a latch member thereon and employs another type of means for engaging and supporting the fastener.
Figure 19:
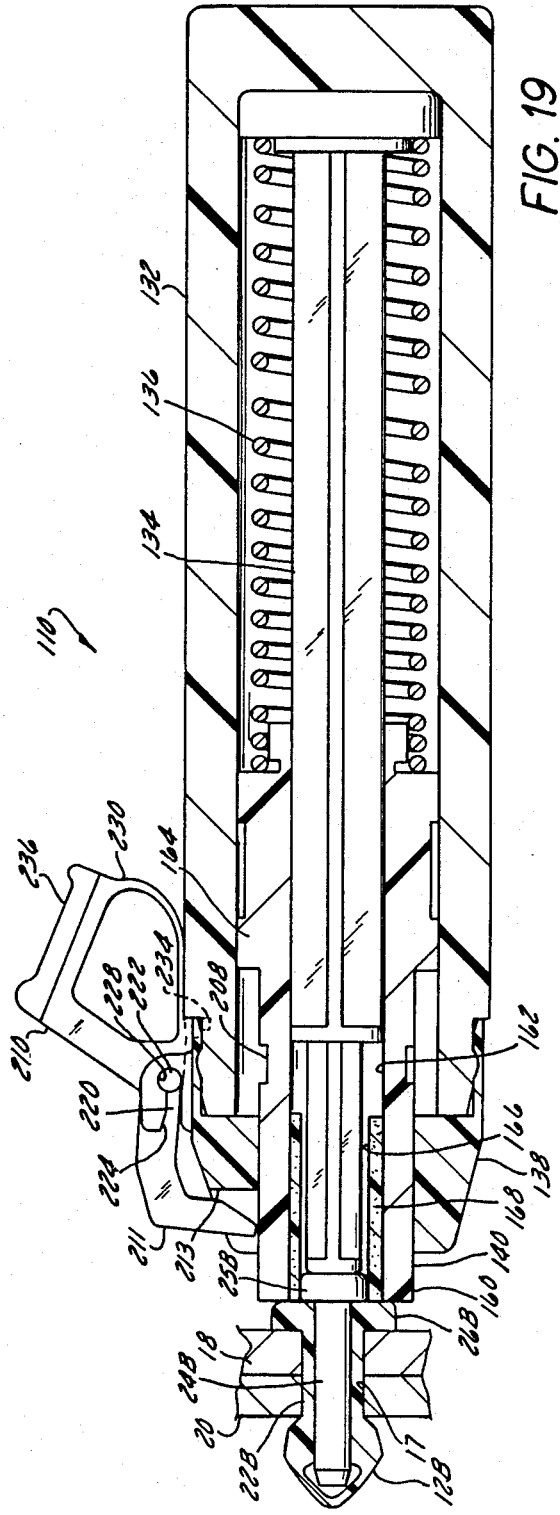
FIG. 19 is a view similar to FIG. 18 but showing the fastener fully installed in a panel hole.

Referring now to FIGS. 18 and 19, numeral 110 designates a second embodiment of a tool in accordance with the invention. Tool 110 has a housing 132 of a different shape than housing 32 of tool 10 previously described and is adapted so that it can be gripped by the human hand or held by a robot hand. Tool 110 differs from tool 10 in two major respects, namely: it is provided with selectively operable locking means and with another form of means for frictionally engaging and supporting a fastener, as hereinafter explained. Tool 110 generally comprises five basic components, namely, a rigid plastic pushrod 134, a biasing spring 136, a removable plastic end cap 138 and a hollow plastic sleeve 140 in which pushrod 134 is slidably mounted. Sleeve 140 has a flange 164 which prevents it from being expelled from the bore 156 of end cap 138.

Sleeve 140 is provided at its outer end or sleeve tip 160 with means for releasably supporting a two-piece fastener, such as fastener 12B comprising a fastener body 22B having a body head 26B and a fastener pin 24B having a pin head 25B. Sleeve 140 has a sleeve bore 162 which extends entirely through the sleeve and is open at both ends to accommodate rod 134. Sleeve bore 162 is lined at sleeve tip 160 with four circumferentially spaced apart strips 168 of resiliently flexible compressible material, such as sponge rubber, which are glued in place. The strips 168 cooperate, when uncompressed, to define an annular recess 166 which is of slightly smaller diameter than pin head 25B. Fastener 12B is mounted on sleeve 140 by manipulating the fastener so as to slidably force pin head 25B into sleeve bore recess 166. As this occurs, the strips 168 compress to allow pin head passage until the fastener 12B assumes the position shown in FIG. 18. The strips 168 frictionally engage pin head 25B and support the entire fastener 12B so that it can be inserted in panel hole 17 by manipulation of tool 110. The strips 168 also allow pin head 25B to be expelled from sleeve bore 162 by rod 134 as pin 24B is forced in fastener body 22B to effect body expansion (FIG. 19). Although four strips 168 are shown, a greater or lesser number could be employed.

Sleeve tip 160 is also able to receive an adapter member similar to 80, previously described, and housing 132 is adapted to receive an extension member similar to 81 (of desired length), previously described, when its end cap 138 is removed and internal components are temporarily removed and replaced. This would adapt tool 110 to accept fasteners with pin heads of larger diameter.

Referring to FIGS. 18 through 22, tool 110 is provided with selectively operable releasable latching means which comprises a manually operable latching assembly 206 mounted on end cap 138 on housing 132 and a latch engaging means, in the form of an annular groove or detent 208 around the circumference of sleeve 140. Latching assembly 206 comprises a trigger member 210, including a latching projection 211 which extends through a slot 213 in end cap 138 and is engageable with groove 208. Trigger member 210 is pivotally (but detachably) mounted on a pair of spaced-apart pivot members 212 (only one visible in FIGS. 18 and 19) integrally formed on end cap 138. Each pivot member 212 comprises a base portion 216 and an integrally formed resiliently flexible curved upper arm portion 218 which cooperates with the base portion to define a tapered slot 220 for receiving one of two outwardly extending cylindrical pivot pins 222 which are integrally formed on trigger member 210. Each arm portion 218 has a sloped ramp surface 224 to facilitate insertion of a pivot pin 222 into slot 220, an intermediate surface 226 making the slot narrower than the diameter of pivot pin 222, and a generally cylindrical surface (open on one side) defining a hole 228 of slightly larger diameter than pivot pin 222. When trigger member 210 is mounted, pivot pin 222 is inserted into the open end of slot 220 and arm portion 218 flexes upward slightly to enable the pivot pin to snap into hole 228 and then flexes downward to trap the pivot pin, while enabling limited rotation of the pin and trigger member 210 between its latched (FIG. 18) and unlatched (FIG. 19) positions.

As FIGS. 20, 21 and 22 show, trigger member 210, which is formed as a one-piece plastic member, as by injection molding, comprises an elongated resiliently flexible portion or strap 230 having a snap-fastener 232 at its free end which is releasably engageable in a friction fit with an opening 234 in end cap 138 (FIG. 19) to hold strap 230 in a curved position (FIGS. 18 and 19) wherein it defines or serves as a biasing spring to normally bias trigger member 210 into latched position wherein projection 211 engages groove 208. However, strap 230, while curved, is flexible and deformable enough to enable trigger member 210 to be manually pivoted (clockwise relative to FIG. 18) to unlatched position wherein projection disengages from groove 208 (FIG. 19). Trigger member 210 is operated, for example, by applying thumb-pressure to its upper side 236 to release the latching means.

The latching means is optionally usable and is placed in latched condition (FIG. 18) when greater force than usual is needed to force fastener body 22B into panel hole 17, prior to setting of fastener pin 24B to effect fastener body expansion. Without the latch means, such force might be greater than is required to effect full compression of biasing spring 136 and tool 110 would operate improperly. The latching means, when engaged, prevents sleeve 140 from moving inward relative to housing 132. Upon completion of insertion of fastener body 12B into panel hole 17, latching member 210 is moved to released condition (FIG. 19) thereby allowing sleeve 140 to depress against spring 136 and into housing 132, thereby enabling pushrod 134 to engage and set fastener pin 24B.

I claim:

1. A tool for installing a two-piece expandable fastener comprising a fastener body having a head and an expandable shank insertable in a panel hole and further comprises a pin associated with said fastener body and depressible in a bore in said fastener body to effect shank expansion, said tool comprising:
    a housing having a housing bore open at one end;
    a pushrod mounted in said housing and extending through said housing bore to near said one end;
    a sleeve having a tip end and having a sleeve bore therethrough for accommodating said pushrod and axially movable relative to said housing bore and to said pushrod between an extended position wherein said tip end extends outwardly from said end of said housing bore and a retracted position wherein said tip end is nearer said one end of said housing bore;
    biasing means in said housing for biasing said sleeve toward said extended position;
    and means on said tip end of said sleeve for releasably engaging a portion of said fastener to support said fastener and to align said pin with said pushrod to enable said body shank to be inserted in said panel hole as said tool is manipulated and to enable said pushrod to engage and depress said pin as said tool is moved toward said panel.

2. A tool according to claim 1 wherein said means comprises a recess communicating with said sleeve bore for receiving and engaging said portion of said fastener.

3. A tool according to claim 2 wherein said means comprises resiliently flexible means defining said recess and for frictionally engaging said portion of said fastener.

4. A tool according to claim 3 wherein said resiliently flexible means comprises a plurality of legs defining said recess.

5. A tool according to claim 3 wherein said resiliently flexible means comprises compressible material in said sleeve bore.

6. A tool according to claim 1 or 2 or 3 or 4 or 5 wherein said means on said tip end of said sleeve comprises an adapter member which is removably mounted on said sleeve.

7. A tool according to claim 6 further including an extension member operatively connected to said pushrod to extend the effective length of said pushrod to account for the length of said adapter member.

8. A tool according to claim 1 or 2 or 3 or 4 or 5 further including selectively operable latching means to prevent retraction of said sleeve as said tool is moved toward said panel.

9. A tool according to claim 8 wherein said latching means comprises a manually operable trigger.

10. A tool according to claim 8 wherein said trigger engages said sleeve to prevent retraction of said sleeve as said tool is moved toward said panel.

11. As an article of manufacture
    for mounting on a fastener installation tool and adapted to support and align a two-piece fastener to be installed by said tool, said fastener comprising a fastener body having a head and a relatively movable fastener pin associated with said body and insertable in a body bore in said body;
    said article of manufacture taking the form of a sleeve made of resilient flexible plastic and having inner and outer ends and an axial sleeve bore therethrough for accommodating a pushrod on said tool;
    at least one slot extending axially inwardly from the outer end of said sleeve to enable resilient flexing of a portion of the sleeve wall adjacent said slot whereby the sleeve bore at the outer end of said sleeve defines a recess which can receive a portion of said fastener body in frictional engagement;
    and shoulder means on said sleeve near said outer end thereof and within said bore for engaging said head of said fastener body to exert axial pressure thereon.

12. An article of manufacture according to claim 11 including a plurality of said slots which are circumferentially spaced apart from each other to provide a plurality of resiliently flexible legs which define said recess and wherein said shoulder means are formed on said legs.

13. As an article of manufacture for releasable attachment to said outer end of said sleeve of the type defined in claim 11 or 12,
    an adapter member in the form of a one-piece tubular member made of resilient flexible plastic and having inner and outer ends and an axial adapter bore therethrough;
    a plurality of resiliently flexible legs projecting inwardly into said adapter bore near the outer end of said adapter member to define a recess which can receive the head of a fastener pin in frictional engagement;
    means in said adapter bore for engaging said outer end of said sleeve;
    and shoulder means on said adapter and within said adapter bore for engaging the head of a fastener body to exert axial pressure thereon.

* * * * *